United States Patent [19]

Storti et al.

[11] Patent Number: 4,989,114
[45] Date of Patent: Jan. 29, 1991

[54] BRIDGE CIRCUIT HAVING POLARITY INVERSION PROTECTION MEANS ENTAILING A REDUCED VOLTAGE DROP

[75] Inventors: Sandro Storti, Sesto S. Giovanni; Bruno Murari, Monza; Franco Consiglieri, Piacenza, all of Italy

[73] Assignee: SGS-Thomson Microelectronics s.r.l., Italy

[21] Appl. No.: 497,026

[22] Filed: Mar. 22, 1990

[30] Foreign Application Priority Data

Mar. 22, 1989 [IT] Italy ................................ 83615 A/89

[51] Int. Cl.$^5$ ............................................. H02H 3/18
[52] U.S. Cl. ...................................... 361/84; 361/18; 307/127; 363/56
[58] Field of Search ............................ 361/18, 84, 91; 302/127; 363/55, 56; 318/280

[56] References Cited

U.S. PATENT DOCUMENTS 4,336,562 6/1982 Kotowski ............................... 361/88
4,654,568 3/1987 Mansmann .......................... 318/280

Primary Examiner—Todd E. Deboer
Attorney, Agent, or Firm—Pollock, Vande Sande & Priddy

[57] ABSTRACT

The additional voltage drop across a guard diode against supply polarity inversion in an integrated bridge circuit for driving an external load and employing two high-side NPN power switches driven by two PNP transistors, all monolithically integrated using a junction-type isolation technique, is substantially eliminated by connecting the emitters of the two PNP drive transistors directly to the positive rail, i.e. to the anode of the guard diode. Integrated PNP transistors are per se intrinsically protected against polarity inversion and when so connected permit to reduce the overall voltage drop across the driving bridge circuit. Using a Zener diode as the guard diode and a second Zener diode connected in opposition to the first Zener between the cathode thereof and the negative supply rail an additional spike protection of the circuit's components is implemented.

3 Claims, 2 Drawing Sheets

BRIDGE CIRCUIT HAVING POLARITY INVERSION PROTECTION MEANS ENTAILING A REDUCED VOLTAGE DROP

BACKGROUND OF THE INVENTION

1. Field of the invention

The present invention relates to an integrated circuit employing NPN power transistors for DC driving an external load, particularly an electric motor, and having a protection against an accidental inversion of polarity of the supply.

2. Description of the prior art

Full-bridge or half-bridge output driving stages, monolithically integrated by employing a junction isolation technique for bidirectional DC driving of motors by means of integrated power switches, are known and widely used. In these integrated power stages the N-type transistors (bipolar NPN or N-channel MOS transistors) are much more efficient than P-type transistors. In practice bridge or half-bridge circuits for high level currents may be economically implemented in an integrated form only if the power switching transistors are of the N-type.

A typical integrated bridge circuit of this kind is shown in FIG. 1. The positive pole of the supply is switched, respectively by the two (high side) NPN power transistors TN1 and TN2, on two output terminals 1 and 2, across which the motor M to be driven is connected. The bridge circuit is completed by two (low side) power transistors TN3 and TN4 which are driven so as to connect to the negative supply pole (ground) the output terminals 1 and 2, respectively. It is also a common practice to drive the two high side switches TN1 and TN2 by means of the two drive PNP transistors TP5 and TP6, respectively, to the base of which the respective drive signals are fed.

The presence of a parasitic diode (respectively D1 and D2 in the circuit diagram of FIG. 1) between an N-type collector C and the P-type substrate S connected to ground of the integrated circuit is intrinsic to such an integrated structure employing a junction-type isolation of an NPN transistor depicted in FIG. 3. In the perspective sectional view of the integrated structure of an NPN transistor of FIG. 3, the presence of this parasitic diode D1 (D2) is schematically shown by means of the relative graphic symbol. The hatched portions of the cross section identify P-type regions while the non-hatched portions identify N-type regions.

Should the supply polarity be accidentally inverted, these parasitic diodes D1 and D2 of the integrated NPN transistors TN1 and TN2 become directly biased and the current passing through these diodes may reach destructive levels.

In order to overcome this problem it is known in the art to use a circuit, such as the one depicted in FIG. 2, wherein a polarity guard diode D3 is employed, which when the supply is accidentally applied with an inverted polarity remains reverse biased thus preventing current flow.

This known solution is not free of drawbacks. In fact, by observing the circuit of FIG. 1, it is easily recognizable that the total voltage drop of the load driving bridge circuit is given by the following expression (for a first diagonal of the bridge):

$$VCE_{SAT}(TP5) + VBE(TN1) + VCE_{SAT}(TN4)$$

or (for the other diagonal of the bridge):

$$VCE_{SAT}(TP6) + VBE(TN2) + VCE_{SAT}(TN3)$$

while in the case of the circuit provided with the guard diode of FIG. 2, the total voltage drop of the circuit is similarly given by the expression (for a first diagonal):

$$V_F(D3) + VCE_{SAT}(TP5) + VBE(TN1) + VCE_{SAT}(TN4)$$

or (for the other diagonal):

$$V_F(D3) + VCE_{SAT}(TP6) + VBE(TN2) + VCE_{SAT}(TN3).$$

It is evident that the use of a diode D3 for protection against polarity inversion of the supply penalizes the electrical efficiency of the circuit by introducing an additional voltage drop $V_F(D3)$ which, in a normal operating condition may be comprised between about 600 mV and 1.2 V.

OBJECTIVE AND SUMMARY OF THE INVENTION

Through the present invention it is possible to reduce down to almost nullifying the additional voltage drop across a guard diode for protection against polarity inversion of the supply though preserving fully the protection afforded by the polarity guard diode.

This objective is fulfilled by connecting in common the emitters of two PNP transistors used to drive the two high-side output power switches (NPN transistors) and directly to the power supply rail.

BRIEF DESCRIPTION OF THE DRAWINGS

The characteristics and advantages of the circuit of the present invention will become evident through the following detailed description of preferred embodiments depicted for purely illustrative and nonlimitative purposes in the attached drawings, wherein.

Figure 3:
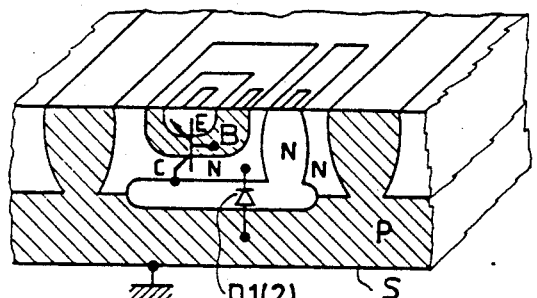
FIG. 3 is a schematic perspective, sectional view of a junction-isolated integrated structure of an NPN transistor.
Figure 4:
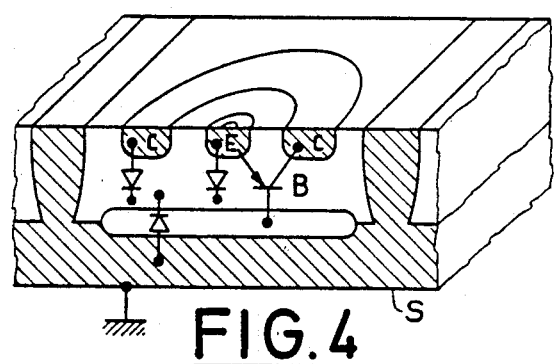
FIG. 4 is a schematic perspective, sectional view of a junction-isolated integrated structure of a PNP transistor.

As it may be easily recognized by observing FIG. 4 in relation to what has been said before for the NPN integrated structure shown in FIG. 3, the integrated structure of a P-type transistor, such as the PNP transistors TP5 and TP6 of the circuits depicted, contrary to an N-type structure, is intrinsically protected against supply polarity inversion because the emitter region E is a P-type region which is isolated from the P-type substrate S by an N-type region (constituted by the buried layer and by the base epitaxial region B which are both N-type regions). Therefore there are series connected diodes having opposite polarity among each other (as schematically depicted on the cross section by means of the relative graphic symbols) which oppose the passage of current whichever the polarity of the supply voltage even if directly connected across the supply rails.

Figure 5:
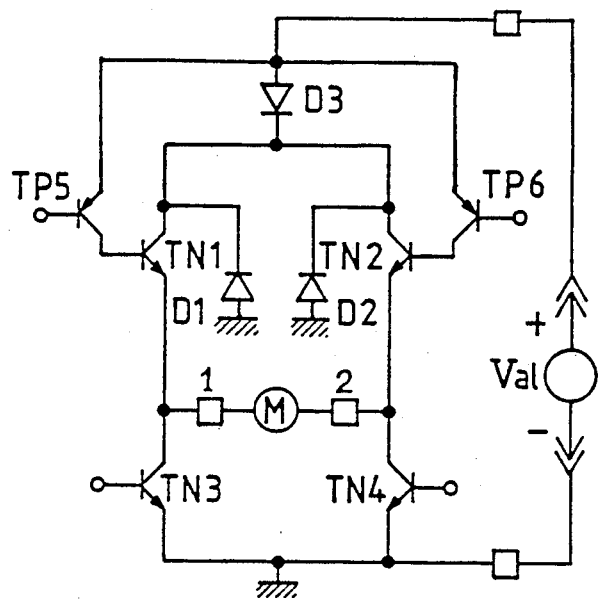
FIG. 5 is an output bridge circuit modified in accordance with the present invention.

It has now been recognized possible to practically nullify the additional voltage drop across the polarity guard D3 by making a bridge circuit as shown in FIG. 5, i.e. by connecting directly to the positive supply rail the emitters of the two PNP transistors, TP5 and TP6, which drive the integrated NPN power switches, TN1 and TN2.

In fact, the total voltage drop of the bridge circuit of FIG. 5 is given by the greater one of the following pairs of expressions: (for a first diagonal), $$VCE_{SAT}(TP6) + VBE(TN2) + VCE_{SAT}(TN3)$$

or (for the other diagonal),
$$VCE_{SAT}(TP6) + VBE(TN2) + VCE_{SAT}(TN3)$$

and (for the same first diagonal), $$V_F(D3) + VCE_{SAT}(TN1) + VCE_{SAT}(TN4)$$

or (for the other diagonal), $$V_F(D3) + VCE_{SAT}(TN2) + VCE_{SAT}(TN3).$$

Figure 1:
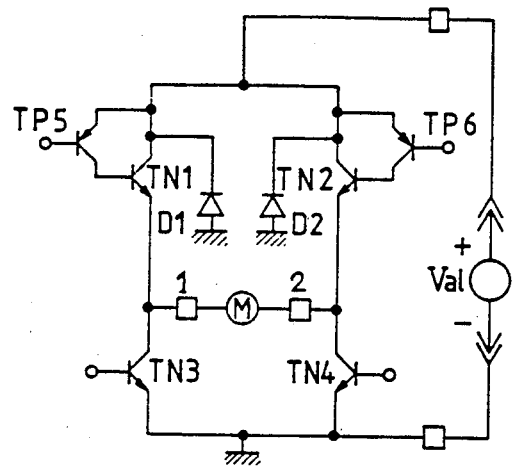
FIG. 1 shows a bridge circuit of the prior art using N-type switches, monolithically integrated by utilizing a junction-type isolation technique.
Figure 2:
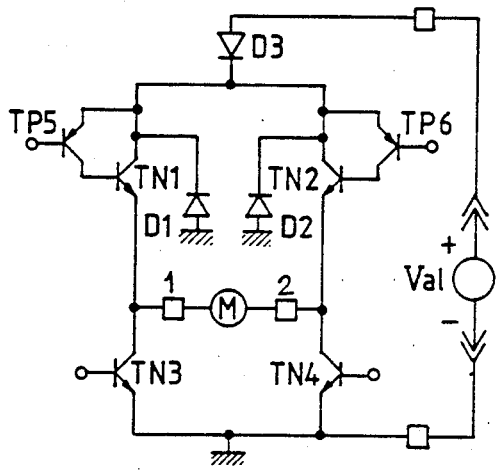
FIG. 2 shows the same bridge circuit of FIG. 1 provided with a polarity guard diode, in accordance with a known technique.

The protection against an accidental inversion of polarity of the supply is ensured by the guard diode D3 while the voltage drop across the driving bridge circuit remains substantially similar to the voltage drop of the bridge circuit of FIG. 1 without the protection diode D3.

Through a correct dimensioning of the structures of the integrated devices which compose the bridge circuit the following conditions may be easily ensured:

$$V_F(D3) \approx VBE(TN1) \approx VBE(TN2)$$

(which indicatively is comprised between 0.6 and 1.2 V); and $$VCE_{SAT}(TP5 \text{ and } TP6) \approx VCE_{SAT}(TN1 \text{ and } TN2)$$

(which indicatively is comprised between about 0.3 and 1.0 V).

The simple solution proposed by the present inventors is applicable, as it will be obvious to the skilled technician, to different types of integrated devices, such as:
  (a) monolithically integrated full-bridge circuit, comprising, beside the drive circuitry also the bipolar NPN power transistors TN1, TN2, TN3 and TN4 and the two drive PNP transistors TP5 and TP6;
  (b) two monolithically integrated, half-bridge circuits, each comprising respectively the transistors TN1, TN3 and TP5 and the transistors TN2, TN4 and TP6;
  (c) a double switch toward the positive supply rail comprising the power NPN transistors TN1 and TN2 and the relative drive PNP transistors TP5 and TP6, which circuit may be coupled to known circuits, either in a monolithic or discrete form, which implement the switches toward ground TN3 and TN4, utilizing either bipolar transistors or MOS transistors or SCR or other equivalent power devices.

For each of these integrated embodiment forms: (a), (b) and (c), the guard diode D3 against supply polarity inversion may be itself monolithically integrated if the particular fabrication process of the integrated circuit allows it or may be a discrete component whenever the overall design economy suggests it.

Notably the protection diode D3 will carry the same current as only one of the two power transistors TN1 or TN2 and never a current double of the latter current because simultaneous conduction of the integrated switches TN1 and TN2 is otherwise excluded by the drive circuitry.

Figure 6:
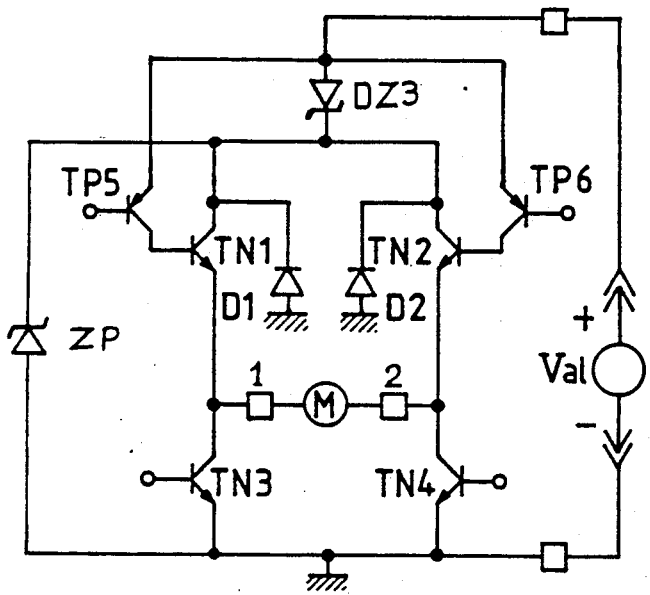
FIG. 6 represents a different embodiment of the circuit of the present invention.

An alternative embodiment of the circuit of the invention which is particularly preferred for integrated devices to be used in car equipments and in similar environments wherein high level spikes and "dump" voltage conditions are likely to occur on the supply, is shown in FIG. 6.

By replacing the diode D3 with an equivalent first Zener diode DZ3 and by connecting a second Zener diode ZP between the ground rail and the cathode of the Zener DZ3, as shown in FIG. 6, the transistors TP5 and TP6 will be effectively protected from negative and positive voltage spikes on the supply.

During normal operation conditions the forward biased Zener diode DZ3 is equivalent to a normal diode (D3 of FIG. 5). In presence of negative spikes on the supply, the current would flow through ZP, TN1 and TN2 in a forward conduction condition and through the reverse-biased Zener diode DZ3, which will maintain the voltage across the transistors TP5 and TP6 limited to the Zener breakdown voltage. In case of positive voltage spikes, the current will flow through DZ3 in a forward conduction condition and through the Zener diode ZP which will limit the voltage to the Zener breakdown or to the Zener breakdown voltage plus the forward voltage drop across the Zener diode DZ3.

What we claim is:
1. An integrated bridge circuit for driving a load connected across two output pins of the integrated circuit which comprises at least the following semiconductor devices, monolithically integrated by a junction-type isolation technique:
  a first NPN transistor having an emitter connected to a first output pin and capable of switchingly connecting said first output pin to a positive supply rail:
  a second NPN transistor having an emitter connected to a second output pin and capable of switchingly connect said second output pin to the positive supply rail;
  a first PNP transistor having a collector connected to a base of said first NPN transistor and capable of driving the latter in function of a driving signal fed to the base of said first PNP transistor;
  a second PNP transistor having a collector connected to a base of said second NPN transistor and capable of driving the latter in function of a driving signal fed to the base of said second PNP transistor;
  the bridge circuit further comprising switching means driven by said driving signals connected between said two output pins and a negative supply rail and a guard diode against an accidental supply polarity inversion having a cathode connected to the respective collectors connected in common of said first and second integrated NPN transistors and an anode connected to a positive supply rail, and characterized by the fact that the respective emitters of said first and second PNP transistors are connected in common and to the positive supply rail for reducing the voltage drop across the bridge circuit.

2. The circuit according to claim 1, wherein said guard diode has a direct resistance under operating conditions of the bridge circuit causing a voltage drop across the guard diode substantially equal to the base-emitter voltage of said NPN transistors, and the collector-emitter saturation voltage of said first and second PNP transistors is substantially equal to the collector-emitter saturation voltage of said first and second NPN transistors.

3. The circuit according to claim 1, wherein said guard diode is a Zener diode and a second Zener diode is connected in opposition thereto between the cathode of said first Zener diode and the negative supply rail for protecting the circuit's components from voltage spikes on the supply rails.

* * * * *